US009210460B2

(12) United States Patent
Huang et al.

(10) Patent No.: US 9,210,460 B2
(45) Date of Patent: Dec. 8, 2015

(54) EFFICIENT ON-DEMAND STREAMING USING MULTICAST

(71) Applicant: Verizon and Redbox Digital Entertainment Services, LLC, Basking Ridge, NJ (US)

(72) Inventors: Jian Huang, Sudbury, MA (US); Jack Jianxiu Hao, Acton, MA (US); Xuefeng Yao, Weston, MA (US); Yuhui Qian, Lexington, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 64 days.

(21) Appl. No.: 14/104,031

(22) Filed: Dec. 12, 2013

(65) Prior Publication Data

US 2015/0172747 A1 Jun. 18, 2015

(51) Int. Cl.
*H04N 21/2365* (2011.01)
*H04N 21/24* (2011.01)
*H04N 21/262* (2011.01)
*H04N 21/44* (2011.01)
*H04N 21/6405* (2011.01)
*H04N 21/6408* (2011.01)
*H04N 21/433* (2011.01)
*H04N 21/472* (2011.01)
*H04N 21/858* (2011.01)

(52) U.S. Cl.
CPC ..... *H04N 21/4331* (2013.01); *H04N 21/47202* (2013.01); *H04N 21/6405* (2013.01); *H04N 21/6408* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 7,191,332 B1 * | 3/2007 | Pankajakshan et al. | 713/163 |
| 2010/0235868 A1 * | 9/2010 | Howarter et al. | 725/82 |
| 2010/0238953 A1 * | 9/2010 | Liu et al. | 370/468 |
| 2010/0254462 A1 * | 10/2010 | Friedrich et al. | 375/240.25 |
| 2011/0191811 A1 * | 8/2011 | Rouse et al. | 725/93 |

* cited by examiner

*Primary Examiner* — Brian T Pendleton
*Assistant Examiner* — Jean D Saint Cyr

(57) ABSTRACT

A user device provides, to a content delivery system, a content request for selected media and receives, in response to the content request, a unicast link for receiving the selected media via a unicast stream and a multicast link for receiving the selected media via a multicast stream. The user device presents a first portion of the selected media via the unicast stream and buffers, in a local memory, a second portion of the selected media from the multicast stream. The second portion is later in linear sequence of the selected media than the first portion. The user device discontinues presenting the first portion of the selected media when the first portion would overlap the second portion and present the second portion of the selected media from the memory.

19 Claims, 10 Drawing Sheets

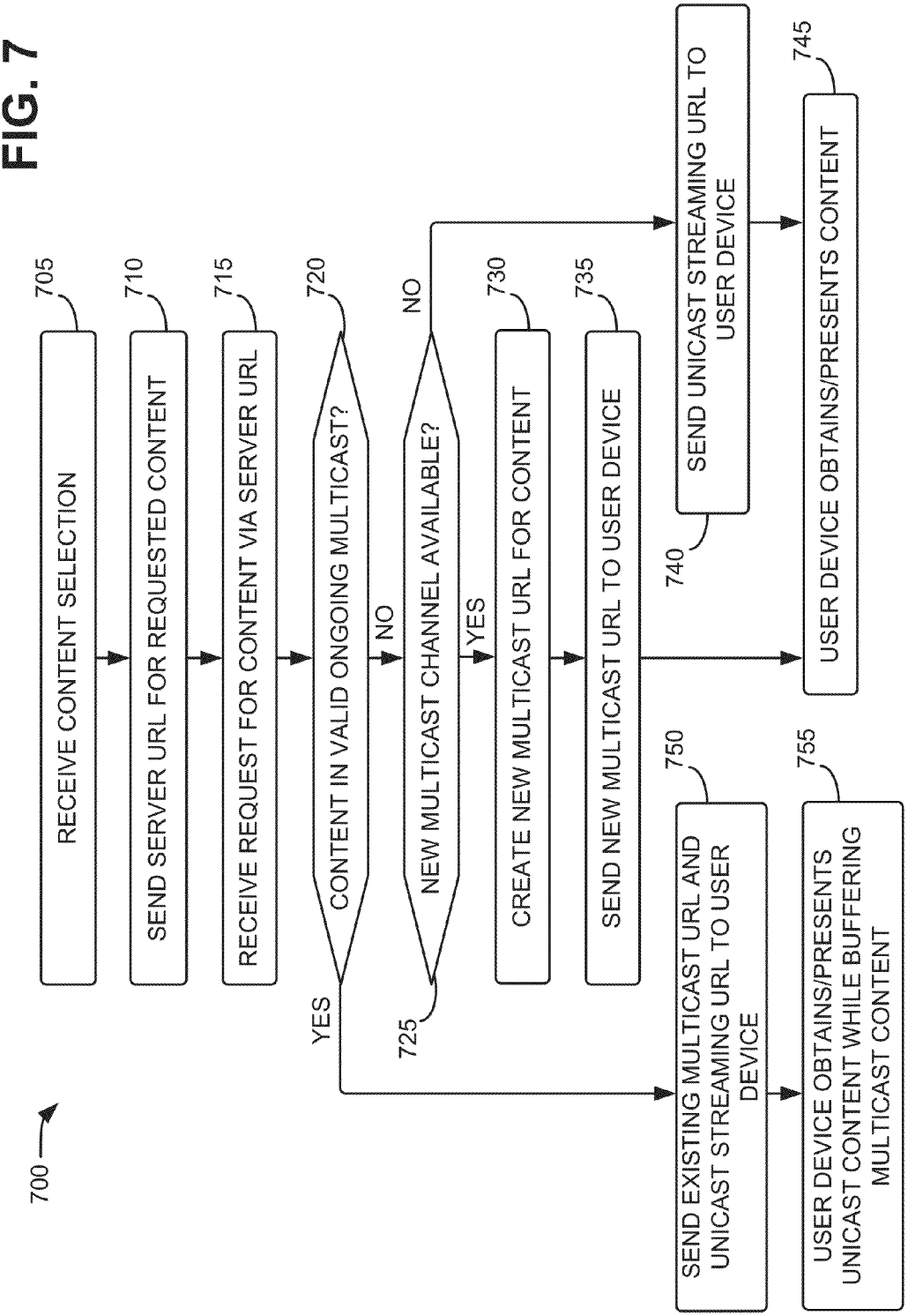

EFFICIENT ON-DEMAND STREAMING USING MULTICAST

BACKGROUND

Video-on-demand (VOD) is becoming an increasingly popular choice for customers of media service providers. Traditional VOD streaming service is based on unicast techniques, which require that a video server or content delivery network send media to each client device separately. However, bandwidth limitations, and particularly wireless bandwidth limitations, can hinder services when a large number of customers (e.g., in a local community) stream and watch VOD around the same time. Because of the nature of VOD, a different steam is started at different times even when client devices are receiving the same content.

BRIEF DESCRIPTION OF THE DRAWINGS

FIGS. 7 and 8 are flow diagrams of an exemplary process for streaming VOD content using multicast and using unicast as may be needed.

DETAILED DESCRIPTION OF PREFERRED EMBODIMENTS

The following detailed description refers to the accompanying drawings. The same reference numbers in different drawings may identify the same or similar elements.

Systems and methods described herein may utilize multicast streaming channels in a manner that optimizes use of network and/or media streaming resources for delivery of video-on-demand (VOD) content. The systems and/or methods may reduce the total network traffic and improve the VOD quality for individual recipients.

According to an implementation, a user device may provide, to a content delivery system, a content request for selected media and receive, in response to the content request, both a unicast link for receiving the selected media via a unicast stream and a multicast link for receiving the selected media via a multicast stream. The user device may present a first portion of the selected media via the unicast stream and may buffer, in a local memory, a second portion of the selected media from the multicast stream. The second portion may be later in the linear sequence of the selected media than the first portion. The user device may discontinue presenting the first portion of the selected media when the first portion would overlap the second portion and may present the second portion of the selected media from the memory.

Figure 1:
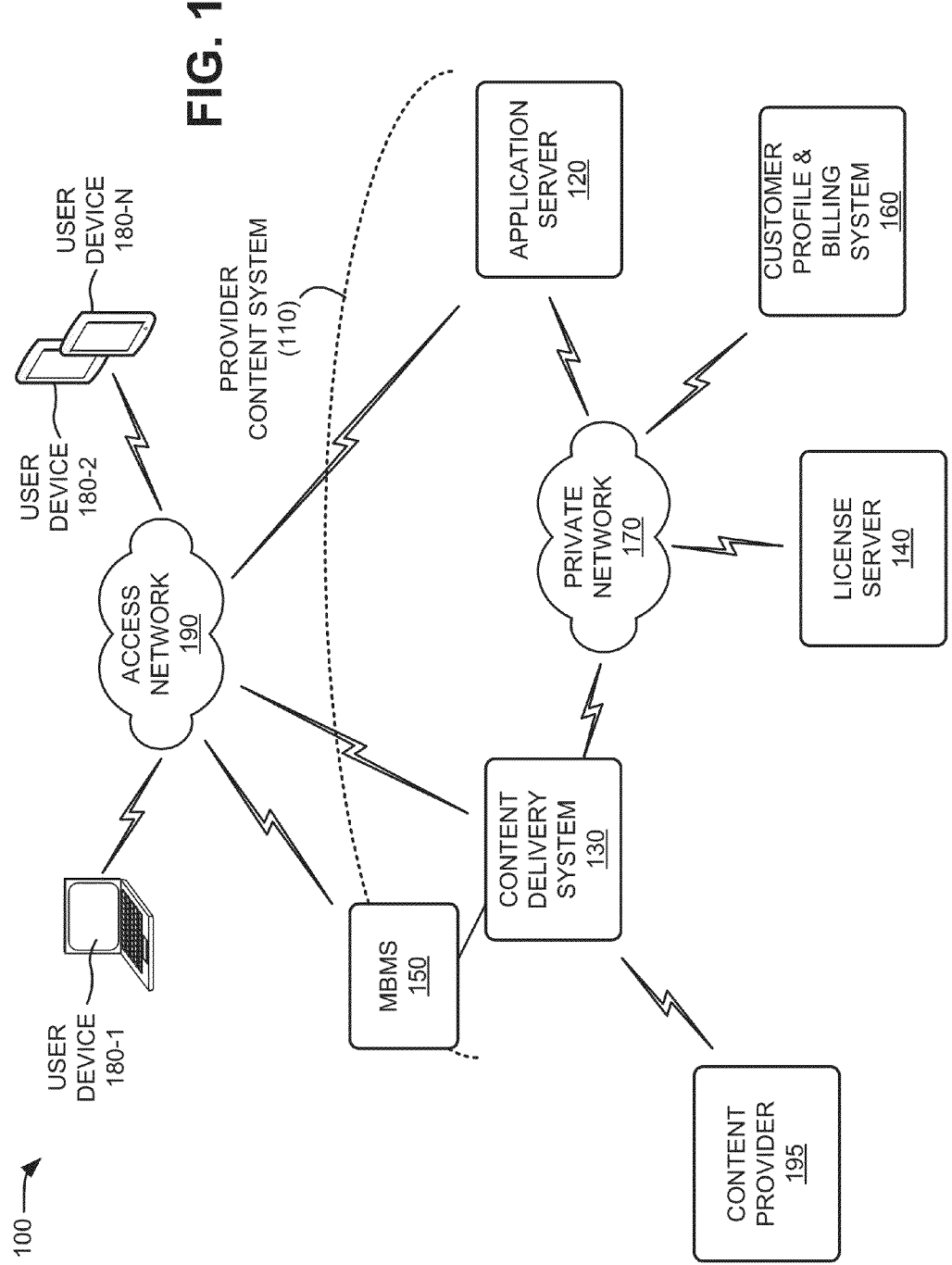
FIG. 1 is an exemplary network in which systems and/or methods described herein may be implemented.

FIG. 1 is an exemplary network 100 in which systems and/or methods described herein may be implemented. As illustrated, network 100 may include a provider content system 110, user devices 180-1 through 180-N (collectively "user devices 180" and individually "user device 180") connected by an access network 190. As further shown, provider content system 110 may include an application server 120, a content delivery system 130, a license server 140, a multimedia broadcast multicast services (MBMS) device 150, a customer profile and billing system 160, and a private network 170. Network 100 may also include a content provider 195 that may or may not be part of provider content system 110.

Provider content system 110 may provide, among other services, digital VOD content available for streaming to user devices 180. For example, provider content system 110 may provide a service subscription that includes entitlements to access a particular library of media for streaming (e.g., provided from content delivery system 130). In one implementation, the library of streaming media may include a subset from a larger collection of content. Interactions between application server 120 and user devices 180 may be performed, for example, using hypertext transfer protocol (HTTP) or secure HTTP (HTTPS) via access network 190.

Application server 120 may manage authentication, selection of content, authorization for streaming content, and/or purchase of content by users of user devices 180. Application server 120 may also link to other backend systems to support applications residing on user devices 180. For example, application server 120 may communicate with customer profile and billing system 160 to authenticate a user who desires to purchase, rent, or subscribe to digital content (e.g., available through content delivery system 130).

In one implementation, application server 120 may permit user devices 180 to download a video application that enables a user to find content of interest and play downloaded or streaming content. Once user device 180 is registered via application server 120, the downloaded video application may enable user device 180 to present, to a user of user device 180, information received from application server 120 in an interactive format, to allow selection of particular content. Furthermore, the video application may coordinate with content delivery system 130 and license server 140 in authorizing user device 180 to access the selected content.

Application server 120 may provide a catalog of content (e.g., digital content available for VOD) for a user of user devices 180 to consume (e.g., rent, subscribe, purchase, etc.). In one implementation, application server 120 may collect and/or present listings of content available to user devices 180. For example, application server 120 may receive digital content metadata, such as lists or categories of content, from content delivery system 130. Application server 120 may use the content metadata to provide currently-available content options to user devices 180.

Application server 120 may receive a login request associated with a user and may initiate a login process. Additionally, or alternatively, application server 120 may request/receive device information (e.g., a registration token) associated with user device 180 via content delivery system 130, and may compare the device information with stored information to validate/authenticate user device 180. Depending on the implementation, the stored information may reside in application server 120, customer profile and billing system 160, etc.

Content delivery system 130 may aggregate content and content metadata, process content, and distribute content. For example, content delivery system 130 may transcode content into a digital format suitable for consumption on particular user devices 180. In some implementations, content delivery system 130 may include a transcoder (hardware or software)

to convert a video file from one format to another (e.g., from one bit rate to another bit rate, from one resolution to another, from one standard to another, etc.). Content delivery system 130 may also encrypt data.

According to implementations described herein, content delivery system 130 may divide streaming media into multiple media segments for delivery to user devices 180. For example a two-hour movie can be divided into 720 segments, with each segment containing about ten seconds of streaming content. Each segment may have at least a clear media frame, so that each segment can be played independently by user devices 180. The multiple segments can be buffered and/or reassembled by a video application (e.g., residing on user device 180) for a cohesive presentation. Content delivery system 130 may support any of a variety of streaming technologies, such as Apple's HTTP Live Streaming, Microsoft's Smooth Streaming, or other streaming technologies.

License server 140 may issue, validate, and/or enforce digital rights management (DRM) licenses to a client, such as an application running on one of user devices 180. In some implementations, license server 140 may determine entitlement rights and/or other authorization parameters via interfaces of application server 120. Such information may be used to authorize a user to access particular content (e.g., issue a license to user device 180), and control/limit the number of concurrent viewing sessions and/or downloads for the user.

MBMS device 150 may deliver digital content from content delivery system 130 to user devices 180 via, for example, a content delivery network (CDN) which includes portions of provider content network 110 and portions of access network 190. MBMS device 150 may provide a point-to-multipoint interface that delivers multicast services to user devices 180. The MBMS device 150 may use IP multicast addresses for the IP flows that can be received simultaneously by users of user devices 180 who have subscribed to, and have joined, the particular multicast group associated with a content selection. In one implementation, MBMS device 150 may include a Broadcast-Multicast Service Center.

Customer profile and billing system 160 may store user profile information for users (e.g., users of user devices 180). The user profile information may include various information regarding a user, such as login information (e.g., a user identifier and a password), billing information, address information, types of services to which the user has subscribed, a list of content purchased by the user, a list of video content rented by the user, a list of video content to which the user has subscribed, a user device identifier (e.g., a media player identifier, a mobile device identifier, a set top box identifier, a personal computer identifier, etc.) for user device 180, or the like. Application server 120 may use the user profile information from customer profile and billing system 160 to authenticate a user and may update the user profile information based on the user's activity.

Customer profile and billing system 160 may also manage charging users for services provided via provider content system 110. Customer profile and billing system 160 may perform credit card checks (e.g., for new subscriptions and/or trial subscriptions, rental or purchase fees, etc.) and process payments for subscriptions, rentals, or purchases with provider content system 110. For example, for new accounts, customer profile and billing system 160 may initiate credit card checks and receive credit card verification from an external billing entity, such as a credit card payment system (e.g., for a credit card account associated with the user) or a bank payment system (e.g., for a debit account associated with the user) associated with the user and/or user device 180, via an external payment API (not shown). For paying (e.g., non-trial) subscribers, customer profile and billing system 160 may also request and receive payments from the external billing entity (e.g., for monthly subscription fees, etc. associated with an account).

Private network 170 may include, for example, one or more private IP networks that use a private IP address space. Private network 170 may include a local area network (LAN), an intranet, a private wide area network (WAN), etc. In one implementation, private network 170 may implement one or more Virtual Private Networks (VPNs) for providing communication between, for example, any of application server 120, content delivery system 130, license server 140, and customer profile and billing system 160. Private network 170 may be protected/separated from other networks, such as public network 190, by a firewall. Although shown as a single element in FIG. 1, private network 170 may include a number of separate networks.

User device 180 may include a computational or communication device that is capable of communicating via access network 190. User device 180 may enable a user to communicate with other devices to select, receive, and present video content (e.g., VOD content) to a user. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

In one implementation, user device 180 may include a video application that enables user device 180 to communicate with, for example, application server 120, content delivery system 130, and/or license server 140. The video application may permit a user of user device 180 to login to an account, access catalog information, submit an order for content to view, receive streaming content, and/or manage buffering of streaming content. User device 180 may also include a local memory that may be configured to buffer extended portions (e.g., several minutes or hours) of VOD content. According to an implementation described herein, user device 180 may manage simultaneous receipt of two media streams (e.g., a multicast stream and a unicast stream) to optimize use of resources in provider content system 110 and/or access network 190 for delivery of video-on-demand (VOD) content.

Access network 190 may include a local area network (LAN), a wide area network (WAN), such as a cellular network, a satellite network, a fiber optic network, a private WAN, the public switched telephone network (PSTN), or a combination of the Internet and a private WAN, etc., that is used to transport data. Although shown as a single element in FIG. 1, access network 190 may include a number of separate networks that function to provide services to user devices 180. In one implementation, access network 190 may provide for multicast delivery of content from provider content system 110 to user devices 180 via a wireless network (e.g., a broadband wireless network, such as a long-term evolutions (LTE) network) and also provide for unicast delivery of the same content (or portions thereof) from provider content system 110 to user devices 180.

Content provider 195 may include any type or form of content provider to provide content to provider content network 110 for distribution. For example, content provider 195 may include free television broadcast providers (e.g., broadcast providers, such as NBC, CBS, ABC, and/or Fox) and for-pay television broadcast providers (e.g., TNT, ESPN, HBO, Cinemax, CNN, etc.) that permit content to be streamed and/or downloaded. Content provider 195 may also include on-demand content providers (e.g., video on demand (VOD) providers, pay per view (PPV) providers, etc.).

In FIG. 1, the particular arrangement and number of components of network 100 are illustrated for simplicity. In practice there may be more application servers 120, content delivery systems 130, license servers 140, MBMS devices 150, customer profile and billing systems 160, user devices 180, networks 170/190, and/or content providers 195. Components of system 100 may be connected via wired and/or wireless links.

Figure 2:
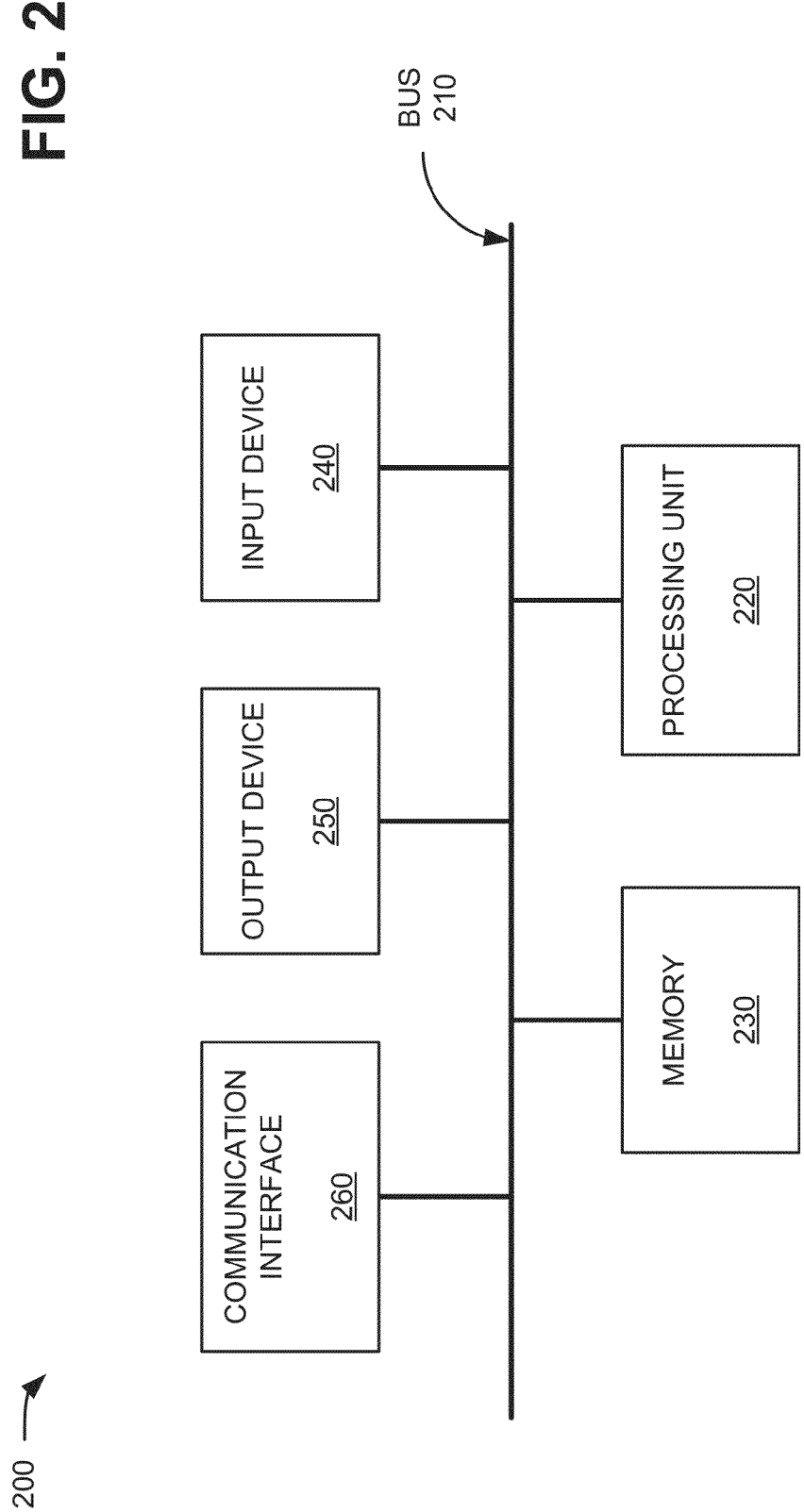
FIG. 2 is a block diagram of exemplary components of a device that may correspond to one of the devices of FIG. 1.

FIG. 2 is a diagram of exemplary components of a device 200. Each of application server 120, content delivery system 130, license server 140, MBMS device 150, customer profile and billing system 160, and user device 180 may be implemented/installed as software, hardware, or a combination of hardware and software, on its respective device 200. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of system 100. Each of such other devices of system 100 may include its respective communication interface 260 to achieve such communication.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
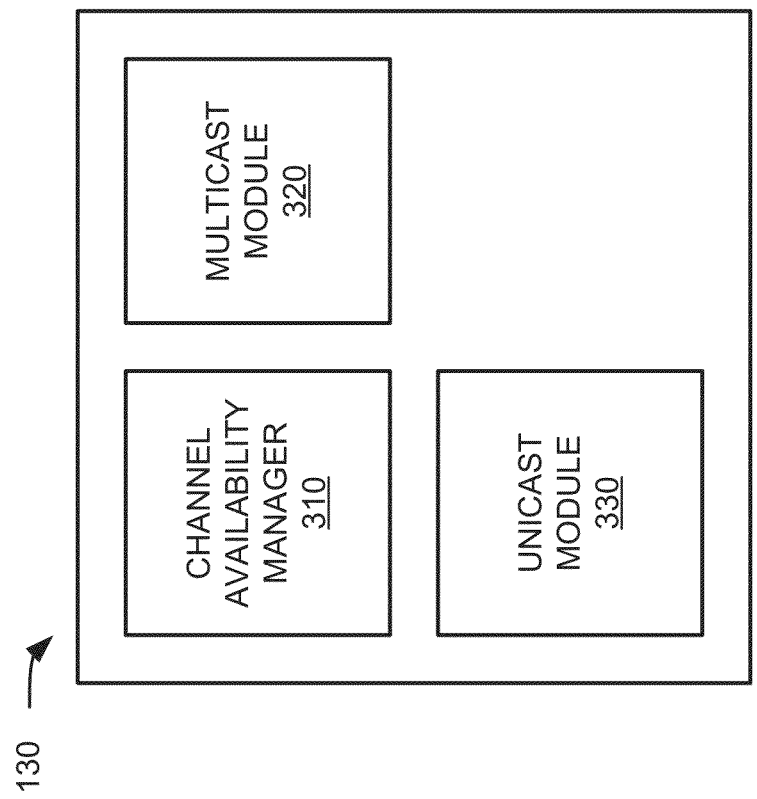
FIG. 3 is a block diagram of exemplary functional components of the user device of FIG. 1.

FIG. 3 is a block diagram of exemplary functional components of content delivery system 130. The functions described in connections with FIG. 3 may be performed by one or more components of device 200 (FIG. 2). As shown in FIG. 3, content delivery system 130 may include channel availability manager 310, a multicast module 320, and a unicast module 330.

Channel availability manager 310 may maintain multicast channels for delivery of streaming VOD content. In one implementation, channel availability manager 310 may associate a multicast channel with a particular link or uniform resource locator (URL). Each multicast channel may include, for example, particular content (e.g., VOD content) that may be streamed to one or more user devices 180. Assuming that there is a limited number of multicast channels available to be used at a given time, channel availability manager 310 may track channel availability and usage to determine if newly requested VOD content can be distributed via a multicast channel. For example, when content delivery system 130 receives a content request from user device 180, channel availability manager 310 may review the currently assigned multicast channels to determine if the requested content is already being provided via a multicast channel or if the requested content can be assigned to a new multicast channel.

In one implementation, channel availability manager 310 may determine that only an ongoing multicast stream having a certain status, such as a certain amount of time (or segments) remaining, will be considered valid for responses to new requests (e.g., in conjunction with unicast delivery of the segments preceding the available multicast content). For example, channel availability manager 310 may not consider a multicast channel with less than ten percent remaining for the selected media stream to service a new request. Channel availability manager 310 may instead start a new multicast stream, if sufficient multicast channels are available. If neither a current multicast channel nor a new multicast channel can be used for the requested content, channel availability manager 310 may assign a unicast delivery for the requested content. As used herein, unicast or unicast delivery may refer to any one-to-one communication session.

Channel availability manager 310 may also maintain a mapping between the channel assignment, with its particular URL, and the media ID (e.g., a unique title, serial number, or hash value) associated with particular content. In one implementation, channel availability manager 310 may also support media channel searching to match content requests with currently-assigned multicast channels.

Multicast module 320 may configure multicast sessions for distribution of VOD content. For example, multicast module 320 may communicate with MBMS device 150 to stream requested video content. In one implementation, provider content network 110 may provide a separate multicast channel of the same content for different content formats. For example, content delivery system 130 may generate a content stream that is compatible with a platform (e.g., a particular combination of hardware software) of some user devices 180 (e.g., user devices with an Android™ platform), while another multicast content stream may be used for other types of user devices 180 (e.g., user devices with an iOS™ platform). The different multicast content downloads may be distributed simultaneously or at separate times, based on the timing of a first request from a user device 180 with a particular platform.

Figure 4:
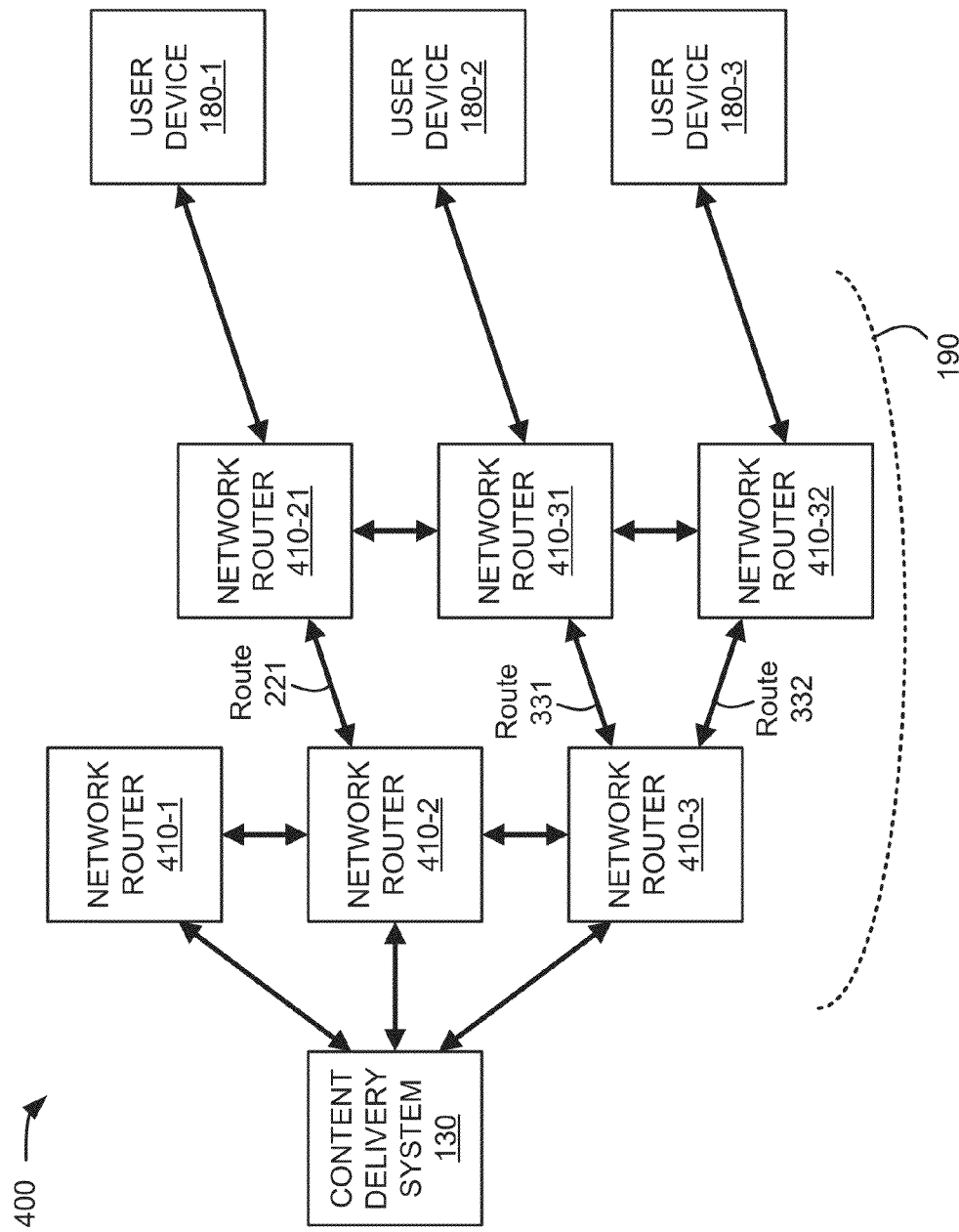
FIG. 4 is a diagram of exemplary communications among devices, servers and systems in a portion of the network of FIG. 1.

In one implementation, multicast module 320 may orchestrate a control plane to optimize use of network and/or media streaming resources. Generally, multicast module 320 may manage distribution so that media content will only be duplicated in a network device (e.g., a router) of access network 190 when necessary. FIG. 4 provides a simplified diagram of a portion 400 of network 100 to illustrate techniques of multicast module 320. As shown in FIG. 4, network portion 400 may include content delivery system 130, access network 190 that includes multiple network routers 410, and user devices 180-1, 180-2 and 180-3.

Referring to FIG. 4, assume only user device 180-2 and user device 180-3 are in the same multicast group (i.e., only user devices 180-2 and 180-3 would like to receive the media content from content delivery system 130). Multicast module 320 may manage distribution so that the multicast media content will only be duplicated in Route 331 and Route 332, and all other "paths" (e.g., route 221, among others) would not need to have the media content.

Network routers 410 may synchronize the multicast status among each other. From example, assume user device 180-1 joins the multicast group with user devices 180-2 and 180-3. Multicast module 320 will send notification to the network router 410-21, and then this new information will be synchronized with all the necessary network routers 410 and content delivery system 130. On the other hand, if one of the user devices 180 finishes streaming, for example user device 180-3, multicast module 320 and network routers 410 will synchronize the information and stop the duplication in the unnecessary network path (e.g., Route 332).

Returning to FIG. 3, unicast module 330 may configure unicast (e.g., one-to-one) sessions for distribution of VOD content. For example, unicast module 330 may establish a session (e.g., a TCP/IP session, UDP session, etc.) with a particular user device 180 to provide content to the particular user device 180.

Although FIG. 3 shows exemplary functional components of content delivery system 130, in other implementations, content delivery system 130 may include fewer components, different components, or additional components than those depicted in FIG. 3. Alternatively, or additionally, tasks of one or more functional components of user device 180 may be performed by one or more other devices. For example, functions of multicast module 320 may be distributed among multiple devices within and outside of content delivery system 130.

Figure 5:
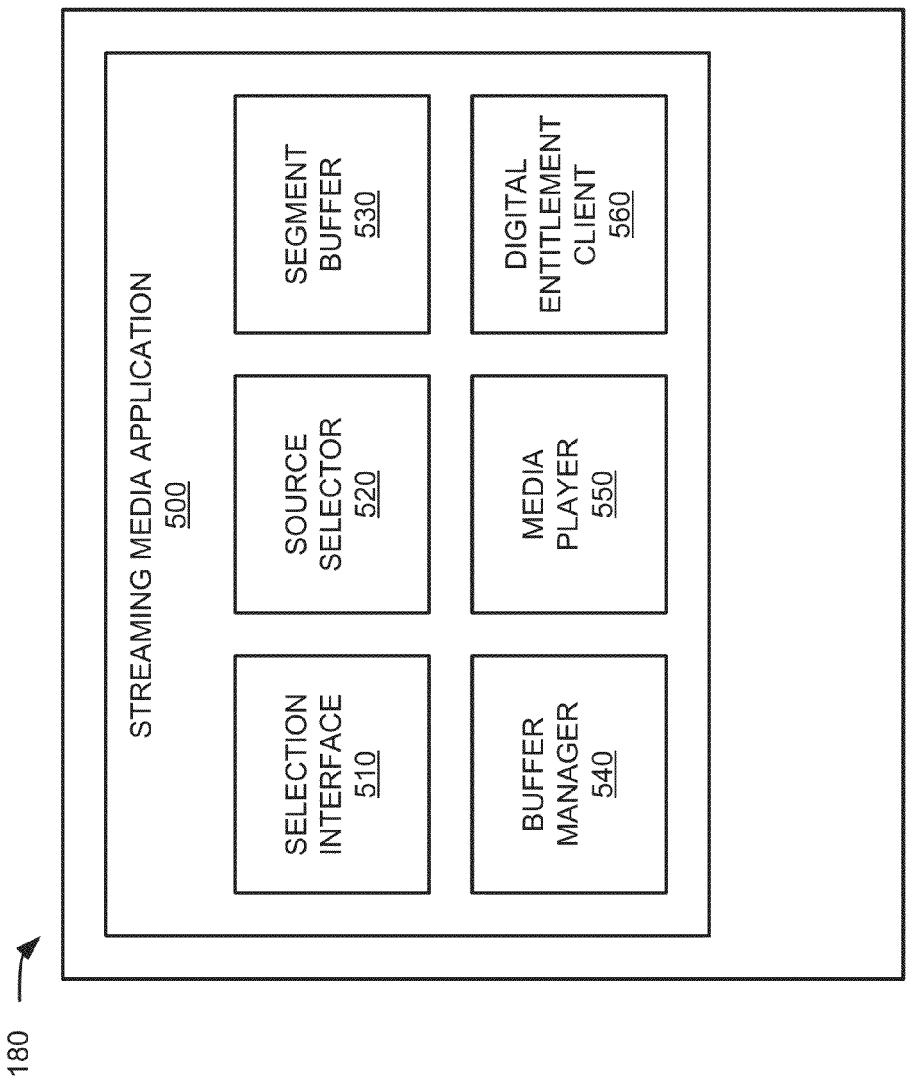
FIG. 5 is a block diagram of exemplary functional components of the user device of FIG. 1.

FIG. 5 is a block diagram of exemplary functional components of user device 180. The functions described in connections with FIG. 5 may be performed by one or more components of device 200 (FIG. 2). As shown in FIG. 5, user device 180 may include a streaming media application 500 that includes a selection interface module 510, a source selector 520, a segment buffer 530, a buffer manager 540, a media player 550, and a digital entitlement client 560.

Streaming media application 500 may include hardware and software components. The software components may be downloaded from application server 120, for example, when user device 180 contacts application server 120 to register for service or to request content from/via content delivery system 130. Generally, streaming media application 500 is configured to support simultaneous presentation of streaming content while buffering subsequent portions of the same content and then provide a seamless transition from streaming unicast content to buffered multicast content. Streaming media application 500 may send a request to content delivery system 130 (e.g., a particular streaming server) for a streaming URL, and initiate streaming. Streaming media application 500 may buffer the streaming data from a streaming channel while playing the current streaming. Streaming media application 500 may also request a different streaming segment based on the local buffer condition. Furthermore, streaming media application 500 may adjust how much data should be buffered based on spare network bandwidth and local available memory.

Selection interface module 510 may provide a user interface to view catalog items, may transmit user selections to application server 120, initiate a unicast or multicast streaming session, etc. Selection interface module 510 may enable a user to request a list of available content (e.g., digital content) and select from the list of available content. When a user selects particular content via selection interface module 510, application server 120 may download metadata and/or streaming information (e.g., a particular URL for content delivery system 130) for the selected content for use by streaming media application 500.

In another implementation, selection interface module 510 may also include an account login interface. For example, selection interface module 510 may request, from application server 120, a list of content available for downloading and may present the list of content to a user of user device 180. Selection interface module 510 may include an interactive client interface that allows a user to provide input, such as user passwords, preferences, and selections from the list of available content. In one implementation, selection interface module 510 may indicate a user's selection (e.g., from the catalog) to application server 120 and, in return, receive specific information to obtain the selected content from content delivery system 130.

Source selector 520 may identify a source from which to present selected content. Streaming media application 500 may play content from either a network stream or a local buffer. In one implementation, stream selector 520 may identify an earliest segment in the local buffer and transition from a network stream to the local buffer when the media presentation reaches earliest segment in the local buffer.

Segment buffer 530 may include a local buffer for a network stream that is being used for a current presentation of content and another local buffer for later segments of the content that may be simultaneously downloaded with the current presentation. In one implementation, segment buffer 530 may be managed by buffer manager 540.

Buffer manager 540 may identify available bandwidth and/or memory to support buffering of content (e.g., multicast content) simultaneously with presentation of current content. Buffer manager 540 may determine whether current bandwidth levels can support simultaneously streaming a unicast stream and a multicast stream. For example, the available bandwidth must be equal to or greater than the bandwidth consumed by the unicast stream.

Buffer manager 540 may also monitor available memory space to store buffered content. In one implementation, buffer manager 540 may overwrite earlier-buffered content (e.g., earlier in time from the same multicast stream) when segment buffer 530 cannot store enough content to reach the end of a selected VOD program. In another implementation, buffer manager 540 may calculate what percentage of a particular content can be stored in memory (e.g., based on the number of total segments, average segment size, available memory space, etc.) and identify a last portion of the content to stream in the background. For example, if buffer manager 540 determines that segment buffer 530 can store thirty minutes of buffered content (e.g., 180 ten-second segments) beyond supporting a current stream, buffer manager 540 may store only the last thirty minutes of a corresponding multicast.

In still another implementation, if buffered segments from the multicast stream include a discontinuity, buffer manager 540 may drop/overwrite the buffered segments prior to the discontinuity (e.g., in linear sequence of the selected media). For example, if bandwidth disruptions cause a discontinuity in the buffering of the multicast stream, buffer manager 540 may drop segments that are prior in sequence to the discontinuity and/or prevent switching from the unicast stream until after the discontinuity.

Media player 550 may receive content segments from a network stream and/or local buffer and may present the content segments as a unified presentation. In one implementation, media player 550 may decode and play content that is streamed and/or buffered from content delivery service 130. Media player 550 may output the decoded video to output components (e.g., a display, speakers, etc.) of output device 250 of user device 180.

Digital entitlement client 560 may acquire licenses for content that are selected by a user for streaming or playing at user device 180. In one example, digital entitlement client 560 may send a request for a license to license server 140. The request may include all or a portion of device registration data (e.g., a registration token) obtained from application server 120. If digital entitlement client 560 receives a license file for the selected content from license server 140, digital entitlement client 560 may store the license file. The license file may include a decryption key, for example, to decrypt the selected content in instances where the particular content has been encrypted for to avoid unauthorized copying or for other reasons. In one implementation, a single license file may be used to decrypt an encrypted version of the selected content from the unicast stream or the multicast stream.

Although FIG. 5 shows exemplary functional components of user device 180, in other implementations, user device 180 may include fewer components, different components, or additional components than those depicted in FIG. 5. For example, user device 180/streaming media application 500 may include a user profile component to track user viewing history, preferences, and/or account activity. As another example, user device 180/streaming media application 500 may include a separate module to correct or verify buffered segments.

Figure 6A:
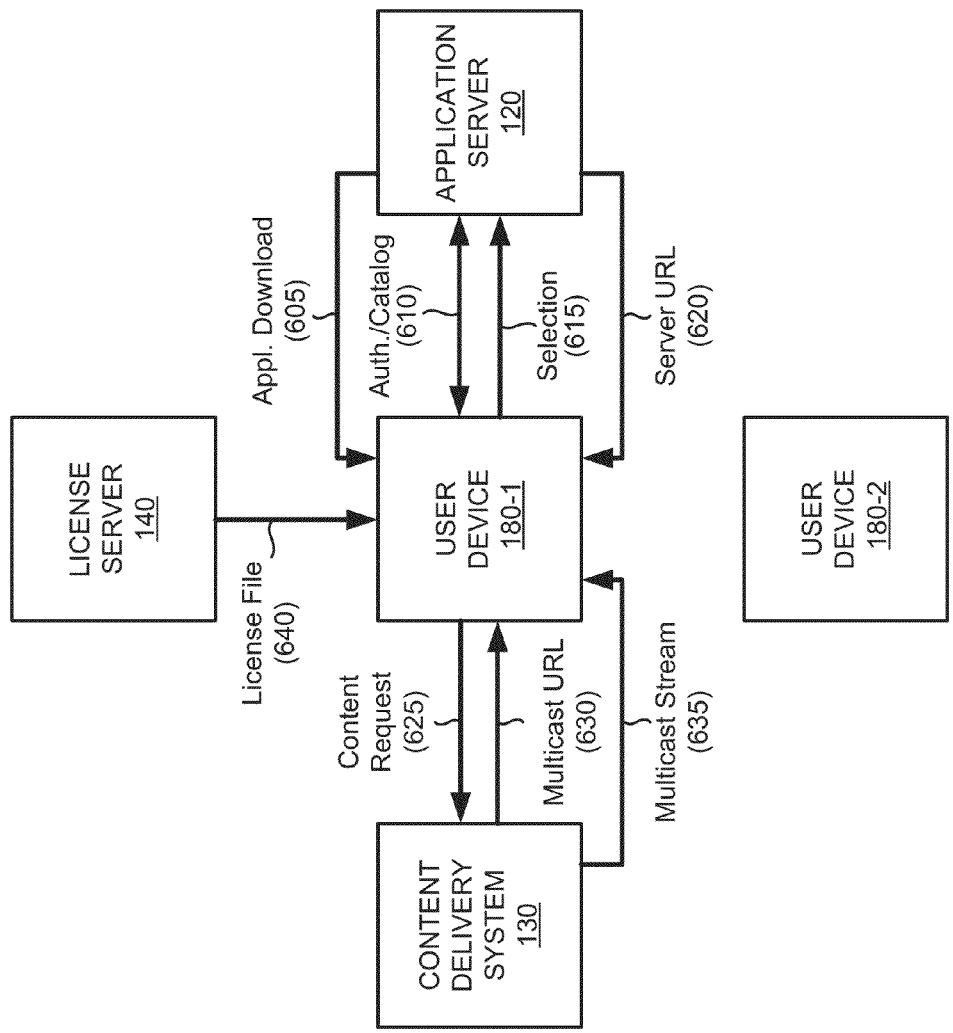
FIGS. 6A and 6B are block diagrams of exemplary communications among devices, servers and systems in another portion of the network of FIG. 1.
Figure 6B:
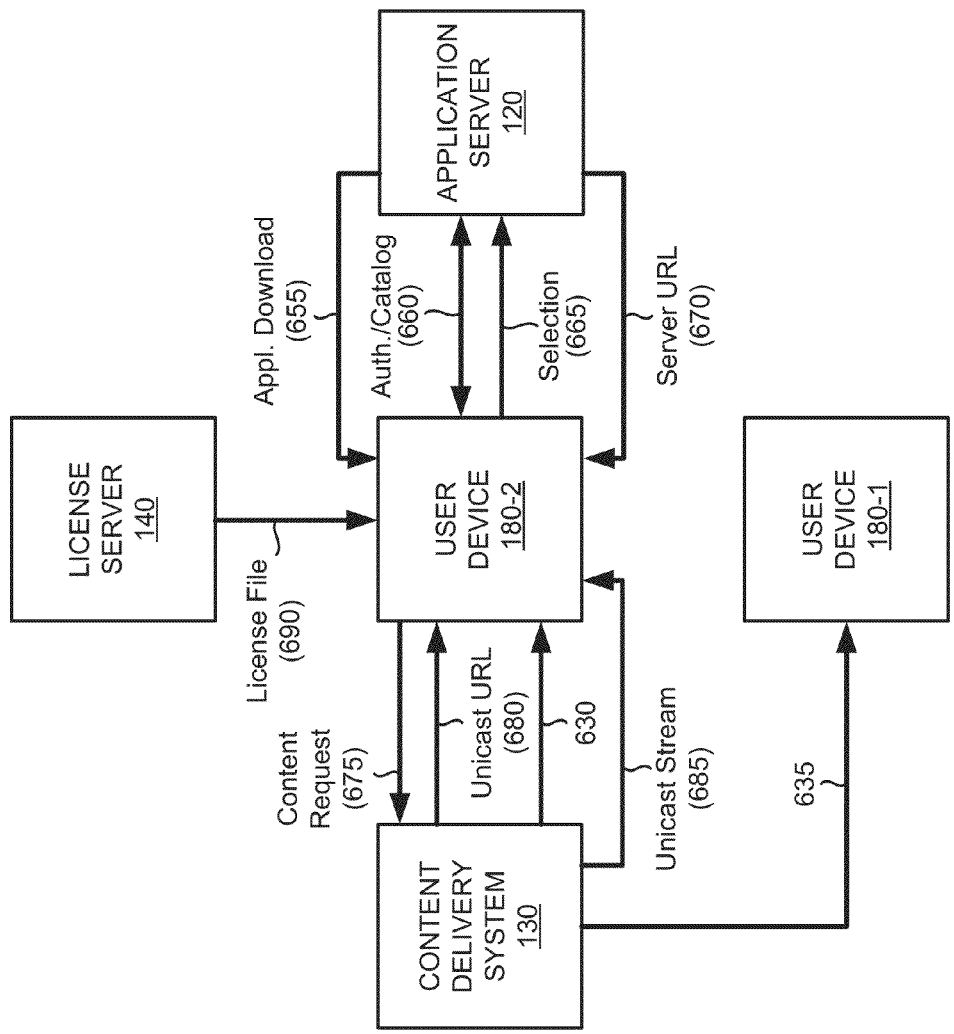

FIGS. 6A and 6B are diagrams of exemplary communications for a portion 600 of network 100. Communications in FIGS. 6A and 6B may represent communications for implementing efficient streaming using multicast from provider content system 110. As shown in FIGS. 6A and 6B, network portion 600 may include application server 120, content delivery system 130, license server 140, and user devices 180-1 and 180-2. Application server 120, content delivery system 130, license server 140, and user devices 180 may include features described above in connection with, for example, FIGS. 1-5.

As shown in FIG. 6A, user device 180-1 may receive an application download 605 from application server 120. Application download 605 may include, for example, streaming media application 500 and/or other components. In one implementation, application download 605 may be initiated during a registration process of user device 180-1 with application server 120 to subscribe for services from provider content network 110.

User device 180-1 may also be authenticated and receive a catalog of content, as indicated by reference number 610. For example, user device 180-1 (using, e.g., selection interface 510 of streaming media application 500) may provide login credentials to application server 120. Application server 120 may verify the login credentials and, if approved, may provide a catalog of available content to user device 180-1. The catalog may include available VOD content that is available for streaming to user device 180-1.

User device 180-1 may receive a user's selection of particular VOD content and may provide an indication of the selection 615 to application server 120. Application server 120 may receive selection 615 and, in response, provide a server URL 620 to user device 180-1. Server URL 620 may include, for example, a URL for a streaming server in content delivery system 130. User device 180-1 may receive server URL 620 and, using server URL 620, may provide a content request 625 to content delivery system 130 for the particular selected VOD content.

Content delivery system 130 may receive content request 625 and determine if another active multicast for the same content/format is in process. Assuming no active multicast for the same content/format is in process, then content delivery system 130 may determine if a multicast channel is available to stream the selected VOD content. Assuming a multicast channel is available, content delivery system 130 may configure a multicast streaming channel for the selected VOD content and provide a multicast URL 630 to user device 180-1. User device 180-1 may then use multicast URL 630 to receive a multicast stream 635 of the selected VOD content.

Separate from delivery of multicast stream 635, license server 140 may provide a license file 640 to user device 180-1. For example, license file 640 may be delivered using a different (e.g., non-multicast) channel when a user starts to view/consume the segments from the multicast stream. License file 640 may include, for example, information to unlock encrypted content for user device 180-1 (e.g., media player 550) to play.

Referring to FIG. 6B (in which the positions of user device 180-1 and 180-2 have been switched for simplification), user device 180-2 may be used to select the same VOD content and format. More particularly, user device 180-2 may receive, from application server 120, an application download 655 similar or identical to application download 605 described above.

User device 180-2 may also be authenticated and receive a catalog of content, as indicated by reference number 660. User device 180-2 may receive a user's selection of the same VOD content (and in the same format) as previously selected by user device 180-1. User device 180-2 may provide an indication of the selection 665 to application server 120 and, in response, receive a server URL 670, which may be identical to server URL 620 previously provided to user device 180-1.

Using server URL 670, user device 180-2 may provide a content request 675 to content delivery system 130 for the same VOD content as previously selected by user device 180-1. Content delivery system 130 may receive content request 675 and determine that a valid active multicast (e.g., multicast stream 635) for the same content/format is in process. Content delivery system 130 may provide a unicast URL 680 to user device 180-2 to stream the selected VOD content from the beginning. Content delivery system 130 may also provide multicast URL 630 to user device 180-2.

As described above in relation to user device 180-1, license server 140 may provide a license file 690 to user device 180-2 (e.g., separate from delivery of unicast stream 680 and multicast stream 635). For example, license file 690 may be delivered to user device 180-2 using a different (e.g., non-multicast) channel when a user starts to view/consume the segments from the multicast stream. License file 690 may include, for example, information to unlock encrypted content for user device 180-2 (e.g., media player 550) to play.

User device 180-2 may then use unicast URL 680 to present the selected VOD content from the beginning via unicast stream 685. User device 180-2 may also use multicast URL 630 to buffer segments from multicast stream 635. When unicast stream 685 progresses to the point of overlap with the buffered segment from multicast stream on user device 180-2, user device 180-2 may discontinue unicast stream 685 and present the remainder of the selected VOD content from the locally buffered segments.

Although FIGS. 6A and 6B show exemplary communications within network portion 600, in other implementations, network portion 600 may include fewer communications, different communications, and/or additional communications than those depicted in FIGS. 6A and 6*b*. Alternatively, or additionally, one or more components of network portion 600 may perform one or more other tasks described as being performed by one or more other components of network portion 600.

FIG. 7 is a flow diagram of an exemplary process 700 for streaming VOD content using multicast and using unicast as may be needed. In one implementation, process 700 may be performed by application server 120 and content distribution system 130. In other implementations, process 500 may be performed one or more devices from provider content system 110 (including, for example, application server 120 or content distribution system 130) and/or user device 180.

Process 700 may include receiving a content selection (block 705), sending a server URL for the requested content (block 710). For example, as described in connection with FIG. 6A, application server 120 may receive selection 615 from user device 180-1 and respond by providing server URL 620. As described in connection with FIG. 6B, application server 120 may receive selection 665 from user device 180-2 and respond by providing server URL 670.

Process 700 may further include receiving a request for content via the server URL (block 715), and determining if the requested content is already in a valid ongoing multicast stream (block 720). For example, content distribution system 130 may receive content request 625 from user device 180-1 (FIG. 6A) and content request 675 from user device 180-2 (FIG. 6B). Upon receiving each content request, content distribution system 130 may determine if the requested content is already being provided in a valid multicast stream. For example, content distribution system 130 (e.g., channel availability manager 310) may compare a unique content ID or other unique identifier for the requested content/format with active multicast channels to determine if a valid ongoing multicast stream already includes the requested content. In one implementation, channel availability manager 310 may determine that a multicast is valid only if there is a minimum (or variable) threshold of remaining segments. For example, a multicast channel with less than 5 minutes remaining may not be deemed a viable current multicast stream for selection purposes.

If the requested content is not already in an ongoing multicast stream (block 720—NO), process 700 may include determining if a new multicast channel is available (block 725). For example, content distribution system 130 (e.g., channel availability manager 310) may determine if a maximum number of multicast channels supported by provider content network 110 and/or content distribution system 130 has been reached.

If a new multicast channel is available (block 725—YES), process 700 may include creating a new multicast URL for the content (block 730) and sending the new multicast URL to the user device (block 735). For example, as described in connection with FIG. 6A, content distribution system 130 may determine that a multicast channel is available to provide content responsive to content request 625. Content distribution system 130 may configure a multicast streaming channel for the selected content and provide multicast URL 630 to user device 180-1.

If a new multicast channel is not available (block 725—NO), process 700 may include sending a unicast streaming URL to the user device (block 740). For example, if no multicast options (either new or ongoing) are available, content distribution system 130 may simply set up a one-to-one streaming session with user device 180 in a conventional manner.

Process 700 may include the user device obtaining and presenting the requested content (block 745). For example, user device 180 may obtain a new multicast stream via the new multicast URL (e.g., block 735) or a new unicast stream via the unicast streaming URL (e.g., block 740). In either case, user device 180 may present the requested content from start to finish using a single stream.

Returning to block 720, if the requested content is already in an ongoing multicast stream (block 720—YES), process 700 may include sending the existing multicast URL and the unicast streaming URL to the user device (block 750). For example, as described in connection with FIG. 6B, content distribution system 130 may determine that a multicast channel is currently providing content responsive to content request 675. Content distribution system 130 may provide the unicast streaming URL for the requested content and the multicast URL for the same content.

Process 700 may further include the user device obtaining and presenting unicast content while buffering multicast content (block 755). For example, as described in connection with FIG. 6B, upon receiving the unicast streaming URL and the multicast URL, user device 180-2 may present the requested content by starting with the unicast streaming URL and simultaneously buffering segments from the multicast URL. When the unicast stream progresses to the point of overlap with the buffered segment from multicast stream, user device 180-2 may discontinue unicast stream 685 and present the remainder of the selected VOD content from the locally buffered segments received via the multicast stream.

Figure 8:
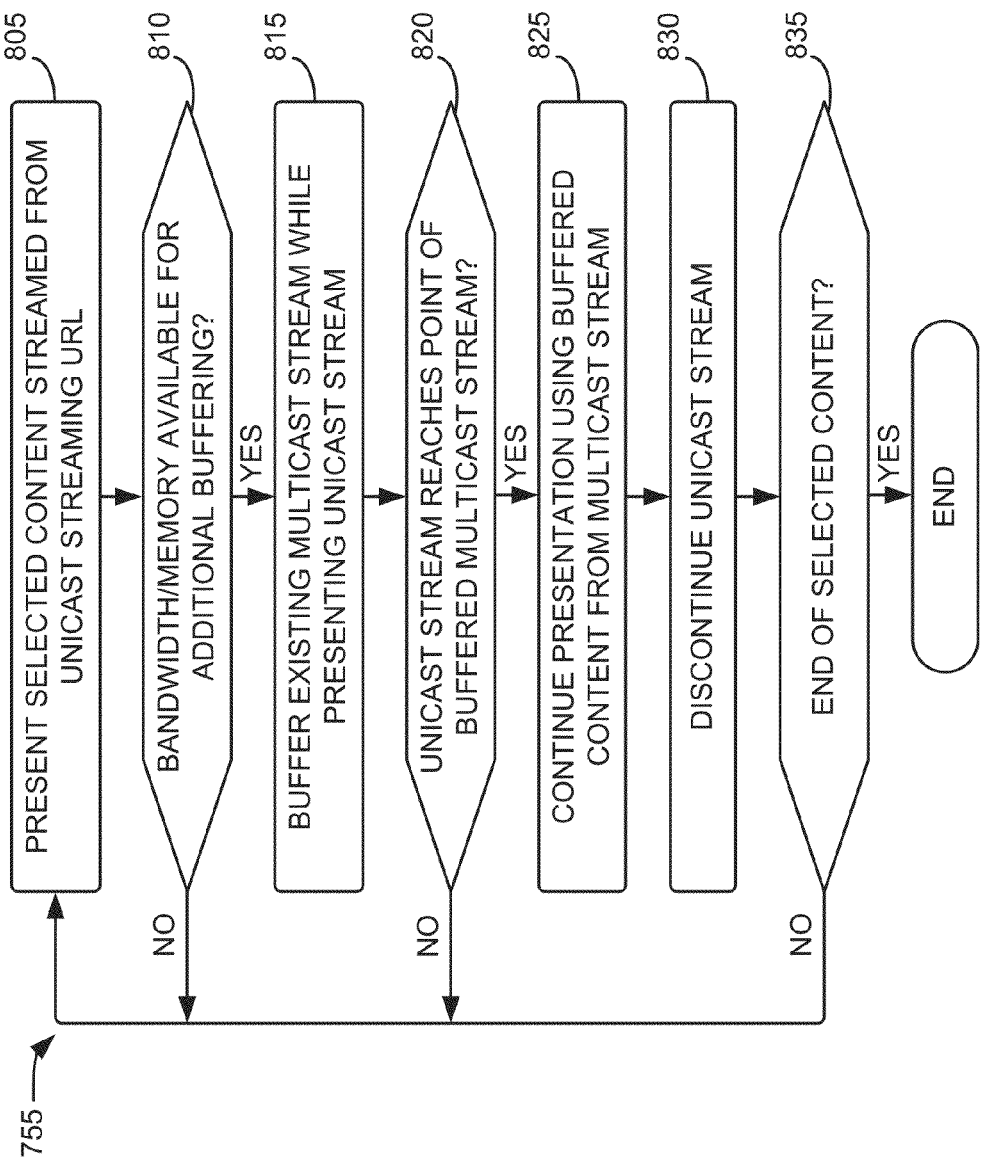

Block 755 is described further in connection with FIG. 8. As shown in FIG. 8, user device may present selected content via the unicast streaming URL (block 805) and determine if sufficient bandwidth/memory is available for additional buffering (block 810). For example, as described in connection with FIG. 6B, user device 180-2 may begin presenting requested content to the user via unicast URL 680. Streaming media application 500 (e.g., buffer manager 540) may determine if there are enough spare network bandwidth and enough local buffer space to buffer content from the multicast channel.

If there is not sufficient bandwidth/memory available for additional buffering (block 810—NO), the user device may continue to present the selected content via the unicast streaming URL (block 805). If there is sufficient bandwidth/ memory available for additional buffering (block 810—YES), the user device may buffer the existing multicast stream while presenting the unicast stream (block 815) and determine when the unicast stream reaches the point of the buffered multicast stream (block 820). For example, as described in connection with FIG. 6B, assuming resources are available, user device 180 may buffer the multicast stream from whatever point in content presentation is currently being streamed. User device 180 may monitor the content presentation to detect when the unicast stream progresses to the point of overlap with the buffered segment from multicast stream.

If the unicast stream does not reach the point of the buffered multicast stream (block 820—NO), the user device may continue to present the selected content via the unicast streaming URL (block 805). If the unicast stream reaches the point of the buffered multicast stream (block 820—YES), the user device may continue presentation of the content using buffered content from the multicast stream (block 825) and discontinuing the unicast stream (block 830). For example, as described in connection with FIG. 6B, user device 180-2 may discontinue unicast stream 685 and present the remainder of the selected VOD content from the locally buffered segments.

If the buffered content does not reach the end of the content presentation (block 835—NO), the user device may continue to present the selected content via the unicast streaming URL (block 805). For example, user device 180 may re-establish a one-to-one session with content delivery system 130 to obtain the remaining content.

Figure 9:
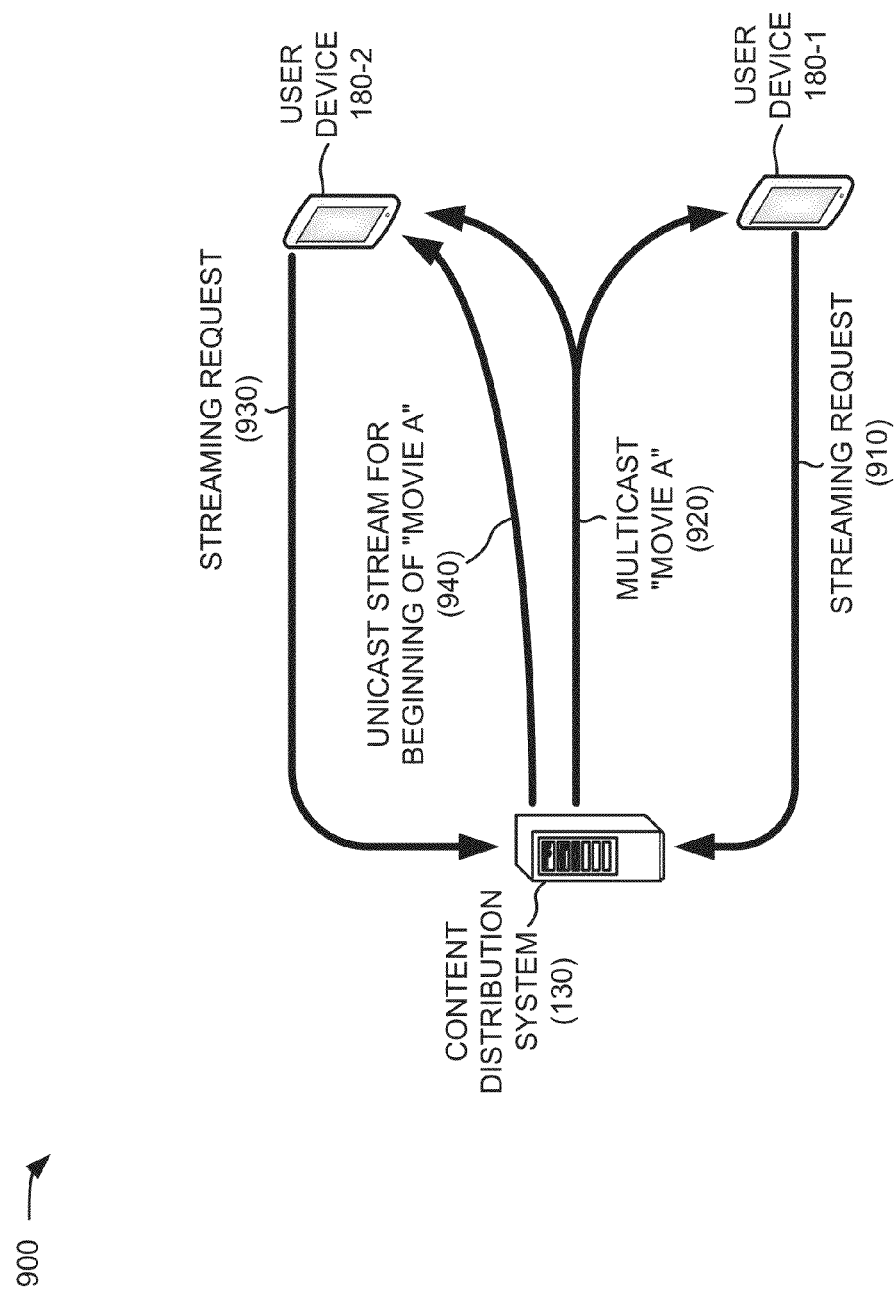
FIG. 9 is a diagram of an exemplary use case according to an implementation described herein.

FIG. 9 provides a diagram of an exemplary use case according to implementations described herein. Assume user device 180-1 submits a request to stream "Movie A." User device 180-1 sends the steaming request to application server 120 (not shown in FIG. 9), and application server 120 sends a server URL to user device 180-1.

As shown in FIG. 9, user device 180-1 may send a streaming request 910 to content distribution system 130. Content distribution system 130 checks if there is a free multicast channel to provide the requested content. Assuming there is a free multicast channel, content distribution system 130 starts a multicast stream for the requested media. (If there is not a free multicast channel, content distribution system 130 would use unicast to stream the movie. Since unicast is a conventional way, the use case address using multicast to stream.) User device 180-1 is notified by content distribution system 130 to start using the multicast channel to stream the requested video content. User device 180-1 begins to present the requested content streamed from multicast "movie A" 920.

Assume that after user device 180-1 streams 100 video segments of multicast "movie A" 920, user device 180-2 sends streaming request 930 to stream "Movie A" in the same format. Content distribution system 130 first checks if this movie is already in a multicast channel, and in this case, will find multicast "movie A" 920. Thus, content distribution system 130 will provide a response to user device 180-2 including a unicast URL and a multicast URL. User device 180-2 first starts streaming the unicast URL to play "Movie A" from segment 1, as indicated by reference 940.

Assume the network bandwidth available to user device 180-2 is 5 Mbps and the streaming bitrate for multicast "movie A" 920 is 2 Mbps. User device 180-2 determines there is available memory and bandwidth to start buffering concurrent streams. Thus, user device 180-2 starts another background streaming connection with multicast "movie A" 920, joining the multicast stream at segment 101. User device 180-2 will save the segments from 101 to a local buffer storage. When user device 180-2 reaches segment 100 of the unicast stream, user device 180-2 stops the unicast streaming and fetch the subsequent segments from the local buffer storage.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
receiving, at a content delivery system and from a user device, a content request for selected media;
determining, by the content delivery system, that the selected media is in an on-going multicast stream;
sending, by the content delivery system and to the user device, a unicast link for receiving the selected media via a unicast stream and a multicast link for receiving the selected media via a multicast stream, when the selected media is in the on-going multicast stream;
presenting, by the user device, a first portion of the selected media via the unicast stream;
buffering, by the user device and in a local memory, a second portion of the selected media from the multicast stream, wherein the second portion is later in a linear sequence of the selected media than the first portion;
discontinuing presenting, by the user device, the first portion of the selected media when the first portion would overlap the second portion;
presenting, by the user device, the second portion of the selected media from the local memory;
receiving, at the content delivery system, another content request for the selected media;
determining, by the content delivery system, that the selected media is no longer in the on-going multicast stream;
sending, to the user device, another unicast link, for receiving the selected media via another unicast stream, when the selected media is no longer in the on-going multicast stream and when a multicast channel is not available to support another multicast stream; and sending, to the user device, another multicast link, for receiving the selected media via a multicast stream, when the selected media is no longer in the on-going multicast stream and when another multicast channel is available.

2. The method of claim 1, wherein the multicast stream is in progress before receiving the content request.

3. The method of claim 1, further comprising:
receiving, by the user device, a catalog of available media;
providing, by the user device, an indication of the selected media from the catalog; and
receiving, by the user device, a server link for providing the content request.

4. The method of claim 1, wherein the unicast stream and the multicast stream include the selected media in a format configured for presentation on a platform of the user device.

5. The method of claim 1, further comprising:
determining, by the user device, that a network connection between the user device and the content delivery system has sufficient bandwidth to support buffering the second portion simultaneously with receiving the first portion.

6. The method of claim 5, further comprising:
determining, by the user device and before beginning the buffering, that the user device has sufficient memory to support buffering the second portion through the end of the multicast stream.

7. The method of claim 5, further comprising:
overwriting, by the user device, the earliest segments in the linear sequence of the second portion when the user device does not have sufficient memory to support buffering the second portion through the end of the multicast stream.

8. The method of claim 1, further comprising:
receiving, by the user device, a license file, wherein the license file includes information to enable the user device to decrypt an encrypted version of the selected media from the unicast stream or the multicast stream.

9. A method, comprising:
receiving, by a content delivery system and from a user device, a content request for particular video-on-demand (VOD) content;
determining, by the content delivery system, if the particular VOD content is currently being provided via an multicast stream;
when the particular VOD content is currently being provided via the multicast stream, sending, by the content delivery system and to the user device, a unicast link that provides access to a unicast stream of the particular VOD content from a beginning of the particular VOD content and a multicast link that provides access to the multicast stream of the particular VOD content;
when the particular VOD content is not currently being provided via the multicast stream and when a multicast channel is not available to use for the particular VOD content, sending, by the content delivery system and to the user device, the unicast link; and
when the particular VOD content is not currently being provided via the multicast stream and when a multicast channel is available to use for the particular VOD content, sending, by the content delivery system and to the user device, another multicast link that provides access to another multicast stream of the particular VOD content from the beginning of the particular VOD content.

10. The method of claim 9, further comprising:
receiving, by an application server, a selection of the particular VOD content; and
sending, by the application server, a uniform resource locator (URL) for the user device to use for the content request.

11. The method of claim 9, further comprising:
creating the other multicast link in response to the content request, when the particular VOD content is not currently being provided via the multicast stream and when a multicast channel is available to use for the particular VOD content.

12. The method of claim 9, further comprising:
streaming simultaneously, by the content delivery system, the particular VOD content to the user device via the multicast stream and via the unicast stream, when the particular VOD content is currently being provided via the multicast stream.

13. The method of claim 12, wherein the unicast stream and the multicast stream include the particular VOD content in a format configured for presentation on a platform of the user device.

14. The method of claim 9, further comprising, when the particular VOD content is currently being provided via the multicast stream:
presenting, by the user device, a first portion of the particular VOD content via the unicast stream;
buffering, by the user device and in a local memory, a second portion of the particular VOD content from the multicast stream;
discontinuing presenting, by the user device, the first portion of the particular VOD content when the first portion would overlap the second portion; and
presenting, by the user device, the second portion of the particular VOD content from the local memory.

15. The method of claim 9, further comprising:
sending, to the user device, a license file that includes information to enable the user device to decrypt an encrypted version of the particular VOD content from the unicast stream, the multicast stream, or the other multicast stream.

16. A network device, comprising:
a memory for storing media segments and instructions to be executed by one or more processors; and
the one or more processors configured to execute the instructions to:
receive, from a user device, a content request for particular video-on-demand (VOD) content;
determine, if the particular VOD content is currently being provided via an multicast stream;
when the particular VOD content is currently being provided via the multicast stream, send, to the user device, a unicast link that provides access to a unicast stream of the particular VOD content from a beginning of the particular VOD content and a multicast link that provides access to the multicast stream of the particular VOD content;
when the particular VOD content is not currently being provided via the multicast stream and when a multicast channel is not available to use for the particular VOD content, send, to the user device, the unicast link; and
when the particular VOD content is not currently being provided via the multicast stream and when a multicast channel is available to use for the particular VOD content, send, to the user device, another multicast link that provides access to another multicast stream of the particular VOD content from the beginning of the particular VOD content.

17. The network device of claim 16, the one or more processors being further configured to execute the instructions to:
create the other multicast link in response to the content request, when the particular VOD content is not currently being provided via the multicast stream and when a multicast channel is available to use for the particular VOD content.

18. The network device of claim 16, the one or more processors being further configured to execute the instructions to:
receive, from another user device, another content request for the particular VOD content; and
when the particular VOD content is currently being provided via the multicast stream, send, to the other user device, a different unicast link that provides access to a different unicast stream of the particular VOD content from the beginning of the particular VOD content and the multicast link that provides access to the multicast stream of the particular VOD content.

19. The network device of claim 16, the one or more processors being further configured to execute the instructions to:
simultaneously stream the particular VOD content to the user device via the multicast stream and via the unicast stream, when the particular VOD content is currently being provided via the multicast stream.

* * * * *